United States Patent
Vitse et al.

(10) Patent No.: US 9,522,359 B2
(45) Date of Patent: Dec. 20, 2016

(54) METHOD FOR REDUCING REGENERATION ENERGY

(75) Inventors: Frederic Vitse, Knoxville, TN (US); Craig Norman Schubert, Lake Jackson, TX (US)

(73) Assignees: General Electric Technology GmbH, Baden (CH); Dow Global Technologies LLC, Midland, MI (US)

(*) Notice: Subject to any disclaimer, the term of this patent is extended or adjusted under 35 U.S.C. 154(b) by 435 days.

(21) Appl. No.: 13/981,227

(22) PCT Filed: Sep. 16, 2011

(86) PCT No.: PCT/US2011/051936
§ 371 (c)(1),
(2), (4) Date: Jul. 23, 2013

(87) PCT Pub. No.: WO2012/106015
PCT Pub. Date: Aug. 9, 2012

(65) Prior Publication Data
US 2013/0298763 A1    Nov. 14, 2013

Related U.S. Application Data

(60) Provisional application No. 61/438,845, filed on Feb. 2, 2011.

(51) Int. Cl.
*B01D 53/14* (2006.01)
*B01D 53/34* (2006.01)
*B01D 53/62* (2006.01)

(52) U.S. Cl.
CPC ....... *B01D 53/1412* (2013.01); *B01D 53/1462* (2013.01); *B01D 53/346* (2013.01);
(Continued)

(58) Field of Classification Search
CPC .......... B01D 2252/20447; B01D 2252/20484; B01D 2252/20489; B01D 2252/504; B01D 53/1412; B01D 53/1425; B01D 53/1462; B01D 53/346; B01D 53/62; Y02C 10/06

See application file for complete search history.

(56) References Cited

U.S. PATENT DOCUMENTS

| 3,839,849 A | 10/1974 | Maniya |
| 4,152,217 A | 5/1979 | Eisenberg et al. |

(Continued)

FOREIGN PATENT DOCUMENTS

| EP | 0066940 A1 | 12/1982 |
| EP | 0502596 A1 | 9/1992 |

(Continued)

OTHER PUBLICATIONS

Reddy et al., "Fluor's Econamine FG PlusSM Technology for CO2 Capture at Coal-fired Power Plants" (2008), 17 pages, available at http://mitei.mit.edu/system/files/reddy-johnson-gilmartin.pdf.

(Continued)

*Primary Examiner* — Duane Smith
*Assistant Examiner* — Cabrena Holecek
(74) *Attorney, Agent, or Firm* — McNees Wallace & Nurick LLC

(57) ABSTRACT

A process and an apparatus are described, which remove acid gas from a gas stream in a manner that generates a product gas stream at a higher temperature while consuming less energy than the existing technology. The process requires maintaining a positive product gas temperature differential. The apparatus enables the positive gas temperature differential to be maintained by manipulating the absorber column operating conditions and/or the solvent chemistry to increase the amount of absorption and reaction in the absorber.

10 Claims, 3 Drawing Sheets

(52) U.S. Cl.
CPC .......... *B01D 53/1425* (2013.01); *B01D 53/62* (2013.01); *B01D 2252/20447* (2013.01); *B01D 2252/20484* (2013.01); *B01D 2252/20489* (2013.01); *B01D 2252/504* (2013.01); *Y02C 10/06* (2013.01)

(56) References Cited

U.S. PATENT DOCUMENTS

| | | |
|---|---|---|
| 4,548,620 A | 10/1985 | Albiol |
| 7,377,967 B2 | 5/2008 | Reddy et al. |
| 2006/0204425 A1 | 9/2006 | Kamijo et al. |
| 2008/0056972 A1 | 3/2008 | Iijima |
| 2008/0317651 A1* | 12/2008 | Hooper et al. ................ 423/230 |

FOREIGN PATENT DOCUMENTS

| | | |
|---|---|---|
| EP | 1688173 A2 | 8/2006 |
| EP | 1759756 A1 | 3/2007 |
| EP | 2269711 A1 | 6/2009 |
| FR | 2938454 A1 | 5/2010 |
| WO | 2004005818 A2 | 1/2004 |
| WO | 2004080573 A1 | 9/2004 |
| WO | 2005009592 A1 | 2/2005 |
| WO | 2007001190 A1 | 1/2007 |
| WO | 2009035340 A1 | 3/2009 |
| WO | 2009105472 A1 | 8/2009 |
| WO | 2009112518 A1 | 9/2009 |

OTHER PUBLICATIONS

Kohl et al., "Gas Purification: Fifth Edition", Gulf Publishing Company, Houston, TX (1997), pp. 58-59, available at http://ebitik.azerblog.com/anbar/2337.pdf.

\* cited by examiner

METHOD FOR REDUCING REGENERATION ENERGY

FIELD OF THE INVENTION

The present invention generally relates to methods and systems of operating a gas absorption column. The present invention more particularly relates to a methods and systems of operating an acid gas absorption column having reduced regeneration energy requirements.

BACKGROUND

There has long been a need in industry to remove acid gas contaminants from a variety of gas and liquid streams. Common examples include gas and liquid phase hydrocarbon streams, synthesis gas streams and more recently combustion gas streams. A variety of techniques, including absorption into liquids, adsorption onto solids and permeation through membranes, have been developed to accommodate these needs. "Gas Purification" Fifth Edition by Kohl & Nielsen (1997) provides a good overview of techniques involving absorption into liquids and into aqueous amines in particular.

The use of absorption and stripping processes with aqueous solvents such as alkanolamines and promoted potassium carbonate is a known, effective technology for the removal of acid gases from flue gas, natural gas hydrogen, synthesis gas and other gases. Recently, there has been interest in aqueous absorption processes using aqueous amines to remove acid gas contaminants from combustion gas streams. Acid gas contaminants include, but are not limited to carbon dioxide, hydrogen sulfide and carbonyl sulfide. In this context, combustion gas is understood to be the vapor/solid phase combustion products of various fuels (coal, oil, biofuels, natural gas, etc.).

Gas absorption is a process in which soluble components of a gas mixture are dissolved in a liquid. Gas/liquid contact can be counter-current or co-current, with counter-current contact being most commonly practiced. Stripping is essentially the inverse of absorption, as it involves the transfer of volatile components from a liquid mixture to a gas. In a typical carbon dioxide removal process, absorption is used to remove carbon dioxide from a combustion gas, and stripping is subsequently used to regenerate the solvent and capture the carbon dioxide contained in the solvent. Once carbon dioxide is removed from combustion gases and other gases, it can be captured and compressed for use in a number of applications, including sequestration, production of methanol, and tertiary oil recovery.

An absorber designed for counter-current gas liquid contact generally admits the solvent at or near the absorber top. This stream may be referred to as the "lean" solvent. The hydrocarbon stream or combustion gas containing acid gas contaminants enters at or near the absorber bottom. As the solvent travels down the absorber tower, acid gas migrates from the vapor phase to the liquid phase. Column internals, typically packing or trays, provide intimate gas/liquid contact. The purified vapor emerges from the absorber top as product gas. This stream may be referred to as the product gas. The "loaded" or "rich" solvent, which now includes a substantial amount of acid gas, emerges at or near the absorber bottom. During standard operating condition, the lean solvent and the product gas are approximately the same temperature, or the product gas stream may be at a temperature slightly less than the lean solvent stream, at the absorber top.

To effect the regeneration of the absorbent solution, the rich solvent drawn off from the bottom of the absorption column is introduced into the upper half of a stripping column, and the rich solvent is maintained at an elevated temperature at or near its boiling point under pressure. The heat necessary for maintaining the elevated temperature is furnished by reboiling the absorbent solution contained in the stripping column. The reboiling process is effectuated by indirect heat exchange between part of the solution to be regenerated located in the lower half of the stripping column and a hot fluid at appropriate temperature, generally saturated water vapor. In the course of regeneration, the carbon dioxide contained in the rich solvent to be regenerated, maintained at its boiling point, is released and stripped by the vapors of the absorbent solution. Vapor containing the stripped carbon dioxide emerges at the top of the stripping column and is passed through a condenser system which returns to the stripping column the liquid phase resulting from the condensation of the vapors of the absorbent solution, which pass out of the stripping column with the gaseous carbon dioxide. At the bottom of the stripping column, the hot regenerated absorbent solution, also referred to as the lean solvent, is drawn off and recycled to the absorption column after having used part of the heat content of the solution to heat, by indirect heat exchange, the rich solvent to be regenerated, before its introduction into the stripping column.

In simple absorption/stripping, as it is typically practiced in the field, aqueous rich solvent is regenerated at about 100° C. to about 120° C. in a simple, countercurrent, reboiler stripper operated at a single pressure, which is usually at about 1 atm to about 2 atm. The rich solvent feed is preheated by cross-exchange with hot lean solvent product to within about 5° C. to about 30° C. of the stripper bottoms. The overhead vapor is cooled to condense water, which is returned as reflux to the countercurrent stripper. When used for carbon dioxide sequestration and other applications, the product carbon dioxide is compressed to about 100 atm to about 150 atm.

A major problem with existing absorption/stripping processes is that they are very energy intensive, and this is largely because the heat required for the reboiler is significant. Energy for reboiler operations may come from the existing power plant boiler, which decreases energy production, or from a dedicated boiler, which increases capital and operating costs. Therefore, it is important to maximize energy efficiency in the design and operation of these systems.

Hence, there exists a need to reduce the energy necessary to regenerate the loaded aqueous amine stream and improve operational efficiency and cost.

SUMMARY OF THE INVENTION

An objective of the present invention is to improve conventional amine-based technologies for acidic gas capture.

Another objective of the present invention is to provide for technology in which carbon dioxide can be removed from combustion gases and other gases by an absorption/stripping process that is significantly more energy efficient than the processes currently practiced.

Another objective of the present invention may reside in the environmental, health and/or economical improvements of reduced emission of chemicals used in such a technology for acid gas absorption.

Accordingly, and depending on the operational and design parameters of a known technology for capture of acidic gases, an objective of the present invention may reside in the reduction of energy and/or chemical consumption in a process for acidic gas capture.

In one aspect, a method of removing acid gases from a gas stream is disclosed. The method of removing acid gases from a gas stream includes the steps of providing a gas stream to an absorber, contacting a gas stream in the absorber with a wash fluid having a solvent to water ratio, and discharging a product gas stream from the absorber. The absorber has a determined removal rate for a predetermined first set of operational parameters comprising a first product gas temperature, a first lean wash fluid temperature, a wash fluid recirculation rate, and a lean wash fluid temperature. The product gas stream is discharged at a second product gas temperature having a product gas temperature elevation greater than zero.

In another aspect, a method of operating an absorption column for removing acid gases from a gas stream is disclosed. The method of operating an absorption column for removing acid gases from a gas stream includes the steps of providing a gas stream to an absorber, contacting a gas stream in the absorber with a wash fluid having a solvent to water ratio, and discharging a product gas stream from the absorber. The absorber has a determined removal rate for a predetermined first set of operational parameters comprising a first product gas temperature, a first lean wash fluid temperature, a wash fluid recirculation rate, and a lean wash fluid temperature. The product gas stream is discharged at a second product gas temperature having a product gas temperature elevation greater than zero.

In another aspect, apparatus for removing acid gases from a gaseous stream is disclosed. The apparatus comprises an absorber having an absorption column, a first feed line for introducing a lean solvent solution into the absorber. A second feed measurement device is provided for measuring the temperature of the lean solvent solution as it is introduced into the absorber, and a second temperature measurement device is provided for measuring a temperature of the gas stream proximate to a location where the lean solvent solution initially contacts the gaseous stream. The first and second temperature measurement devices are in communication with a control system that monitors the temperature of the lean solvent solution as it is introduced into the absorber as well as the temperature of the gas stream at or near the location where the lean solvent solution initially contacts the gas stream. As used herein, the term "at the location where the lean solvent solution contacts the gas stream" and/or "proximate to where the solvent solution first contacts the gas stream" means at or near the location within the absorber where the lean solvent solution contacts or meets the gas stream. For example, at the location proximate to where the lean solvent solution contacts the gas stream may include the exact point where the gas stream contacts the lean solvent solution, at a point on the absorber at the center of the absorber, or on the side of the absorber adjacent the point where the gas stream contacts the lean solvent solution, or at a point just below, or in the vicinity of, where the gas stream contacts the lean solvent solution. Because the gas pressure of the gas stream introduced into the absorber may vary, the exact point where the gas stream contacts the lean solvent solution also may vary, and a series of temperature measurement devices may be positioned in the absorber, the control system determining which temperature measurement device is at the location where the lean solvent solution contacts the gas stream by the analyzing the temperatures monitored. So, proximate may mean as little as one inch and as much as two feet, depending on the variable characteristics of the system, including but not limited to absorber size and flow rates of fluids. When a plurality of temperature measurement devices are used, the specific temperature measurement device at the location where the lean solvent solution contacts the gas stream can be determined by the control system monitoring the temperature measuring devices and will become apparent as the invention is explained in more detail.

Other features and advantages of the present invention will be apparent from the following more detailed description of the preferred embodiment, taken in conjunction with the accompanying drawings which illustrate, by way of example, the principles of the invention.

DETAILED DESCRIPTION

Specific embodiments of systems and processes for removal of acidic gases according to the invention are described below with reference to the drawings.

The present invention is directed to systems and methods to remove an acid gas from gaseous steams in a manner that generates the product gas stream at a higher temperature while consuming less energy than the existing technology.

Figure 1:
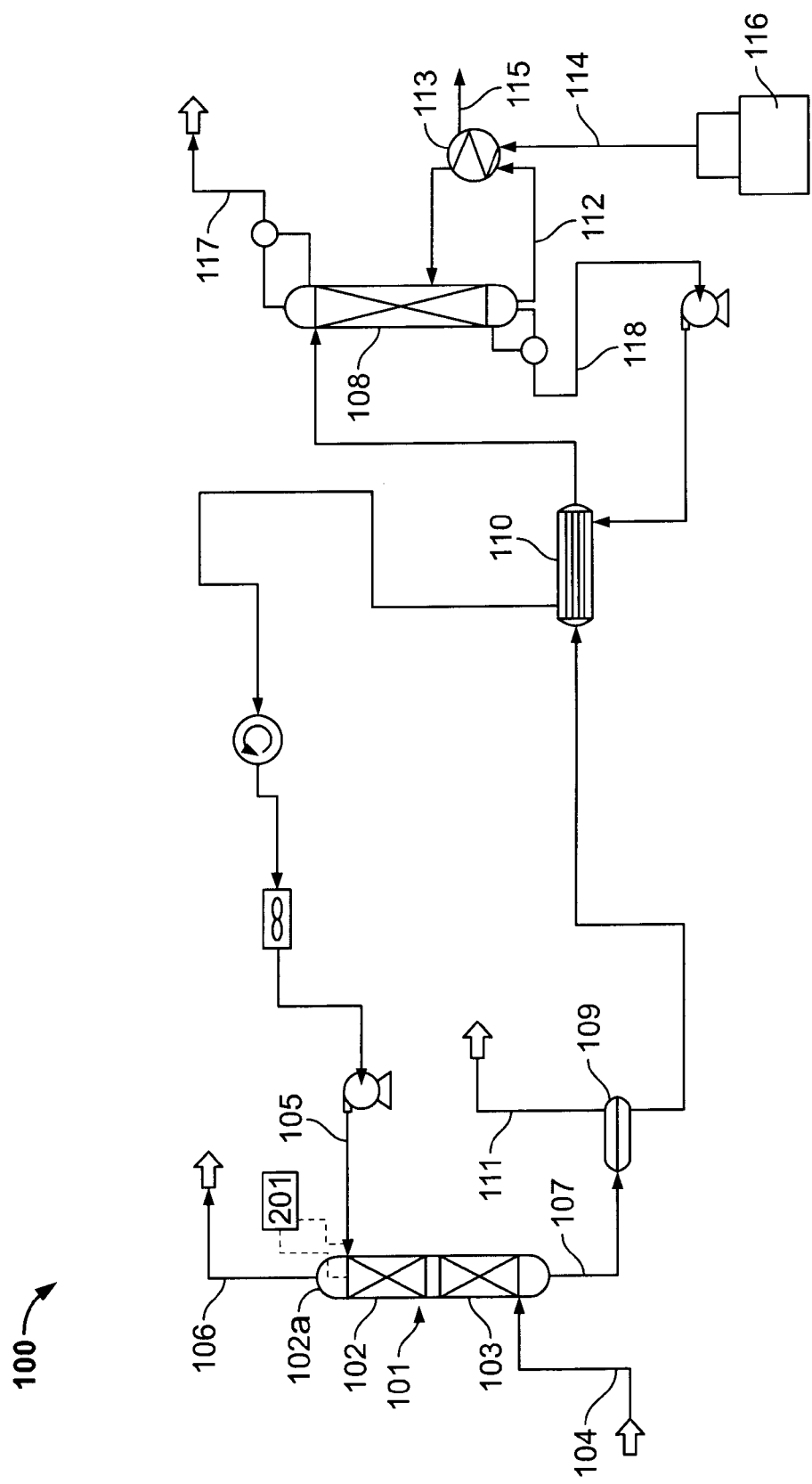
FIG. 1 is a schematic representation of an acid gas capture system according to the disclosure.

FIG. 1 is a schematic representation of an exemplary embodiment of an acid gas capture system 100 according to the disclosure. In one embodiment, the acid gas capture system 100 may be an amine-based acid gas capture system. In one embodiment, the acid gas capture system 100 may be an amine-based $CO_2$ and/or hydrogen sulfide capture system. The acid gas capture system 100 includes an absorption column or absorber 101. The absorber 101 is configured to contact a gas stream to be purified and a solvent solution. The absorber 101 may be a counter-current absorber. In one embodiment, the absorber 101 is a $CO_2$ absorber. In one embodiment, the gas stream is a flue gas stream containing $CO_2$. In one embodiment, the solvent solution is an amine-based solution. The absorber 101 includes two absorption sections, an upper section 102 and a bottom section 103. In another embodiment, the absorber 101 may include one or more absorption sections. The absorption sections may include gas/liquid contact devices including, but not limited to, packing media and/or trays (not shown) for improving gas/liquid contact. The gas stream from which the acid gas is to be removed enters the bottom section 103 of the absorber 101 via a feed gas feed line 104. In the absorption sections of the unit, flue gas is contacted with the solvent solution.

The lean solvent solution is fed to the upper section 102 of the absorber 101 via a lean solvent solution feed line 105. The lean solvent enters the absorber 101 at a lean solvent temperature, $T_{LS}$. The lean solvent temperature may be measured at or proximate to the point where the lean solvent enters the absorber 101. The lean solvent temperature may be measured by a temperature measurement device (not shown), such as a probe, which provides the lean solvent temperature to a control system 201. In one embodiment, the lean solvent temperature is measured at or proximate to the center of pipe or conduit at or proximate to the inlet to the absorber 101. The temperature measurement device may transmit the temperature data to the control system 201 by wire and/or wireless devices.

The control system 201 also measures the product gas temperature. The control system 201 monitors the lean solvent temperature and product gas temperature. The product gas temperature is the temperature of the product gas where the lean solvent solution is first distributed in the absorber 101. In one embodiment, the product gas temperature may be measured at the top tray or top level of packing media by a suitable temperature measurement device (not shown) located proximate to the location where the lean solvent solution is first distributed in the absorber 101. In one embodiment, the product gas temperature is the temperature of the product gas exiting the absorber 101 or at a location or position at or proximate to the absorber top 102a. In one embodiment, the product gas temperature is measured in the absorber column head, proximate to the liquid inlet port but not in contact with the liquid spray or mist. If a water wash is used to further treat the product gas after the absorption sections, the product temperature is the temperature of the product gas before the water wash. In other words, the product gas temperature reflects the amount of energy leaving the absorber in the gas phase rather than the liquid phase.

In the absorber 101, acid gas from the gas stream is chemically absorbed in the solvent solution. Flue gas depleted of acid gas, the product gas, leaves the absorber 101 from the upper section 102 of the absorption unit 101 via a product gas discharge line 106. Solvent solution comprising absorbed acid gas, referred to as a rich wash solution, leaves the absorber 101 from the bottom section 103 via a solvent solution discharge line 107.

The rich solvent solution leaving the absorber 101 is provided to a regenerator 108 via a solvent solution discharge line 107. The regenerator 108 may be a countercurrent regenerator or other regenerator(s) that manage heat associated with the exothermic absorption reaction in an absorber. The invention leads to improved absorption rates in the absorber, leading to improved regeneration conditions (higher rich loading, lower regeneration temperatures) independently of the regenerator type or scheme. In the regenerator 108, acid gas is separated from the solvent solution to produce a "lean" solvent solution for reuse in the absorption unit 101. The rich solvent solution may be cooled in a flash unit 109 and/or heat exchange unit 110 before being provided to the regenerator 108. Flash gas may be discharged from the flash unit 109 via a flash gas discharge line 111.

In the regenerator 108, the rich solvent solution is stripped of acid gases at low pressure and elevated temperature. The solvent solution is heated by circulating the solvent solution through a heating circuit 112. The heating circuit 112 includes a heat exchange unit 113. In the heat exchange unit 113, the solvent solution is heated by exchanging heat with a heating fluid provided by a heating fluid feed line 114. The heating fluid is discharged from the heat exchanger 113 via a heating fluid discharge line 115. The heating fluid may be heated by a heating unit 116. In one embodiment, the heating fluid is steam and the heating unit 116 is a boiler unit.

Acid gas, desorbed from the solvent solution, is discharged from the regenerator 108 via an acid gas discharge line 117. Lean solvent solution is discharged from the regenerator 108 via a lean solvent solution discharge line 118 and returned to the absorption unit 101. The lean solvent solution may exchange heat with and cool rich solvent solution in heat exchanger 110. As can be appreciated by one of ordinary skill, the acid gas capture system 100 expends energy, and thus has a cost associated with the heating of the heating fluid provided by the heating unit 116. In one embodiment, the heating unit 116 takes energy from existing power plant boiler capacity, which increases operating costs. In another embodiment, the heating unit 116 takes energy from a dedicated boiler unit, which increases capital and operating costs. In yet another embodiment, the solvent solution may be heated from the combustion of natural gas, increasing capital and operating costs. In one embodiment, the energy costs associated with regeneration may be measured by the reboiler duty.

Under prior art operating conditions, the absorber 101 is operated under standard or recommended operating parameters. The standard or recommended operating conditions are predetermined to establish a continuous operation at equilibrium conditions to remove a certain amount of acid gas, which may be referred to as a removal requirement. The standard operating parameters include, but are not limited to, product gas temperature, solvent solution temperature, solvent solution to gas mass flow rate ratio, reboiler duty, regenerator pressure, and product gas temperature elevation.

The product gas temperature elevation, or positive gas temperature differential, as used in this disclosure is defined as the difference between the product gas temperature at a location proximal to where the solvent solution first contacts the gas stream and the lean solvent solution temperature, wherein the difference is positive. The lean solvent solution temperature is the approximate temperature of the lean solvent solution prior to contacting the product gas stream. The lean solvent solution temperature may be measured adjacent to the point of first contact with the product gas stream, or may be measured at a point distal from the point of first contact with the product gas stream provided that those two temperatures are approximately equal. Thus, measuring the lean solvent solution temperature at a location distal the location of first contact with the gas stream should be construed to mean measuring the temperature of the lean solvent at any point prior to first contact of the lean solvent solution with the gas stream, where the lean solvent has not absorbed any of the constituents of the gas stream and where the temperature of the lean solvent solution is equal to or within about 1° C. of the temperature of first contact with the gas stream. In one embodiment, approximately equal means less than or equal to about 1° C. In general, the product gas temperature may be at about the same or approximately equal to the lean solvent solution temperature. The product gas temperature and the lean solvent solution temperature may be approximately equal or very close to one another, within a degree centigrade or less of each other. It will be understood that this temperature differential is essentially unregulated in the prior art, and any temperature differential, either positive or negative, is a result of random temperature fluctuations between the gas temperature of the incoming gas stream and the temperature of the lean solvent solution.

In the prior art, conventional operation will lead to a quasi-thermal equilibrium between gas phase and solvent solution. The gas phase thus exits the absorber at approximately the solvent solution temperature. In contrast, it has unexpectedly been found that regeneration energy can be reduced by operating the absorber 101 with a positive product gas temperature elevation, that is, the temperature is greater than zero. In another embodiment, the inventors have found that regeneration energy can be reduced by operating the absorber 101 with a product gas temperature elevation of greater than about 5° C. In another embodiment, the inventors have unexpectedly found that regeneration energy can be reduced by operating the absorber 101 with a product gas temperature elevation greater than about 10° C. In another embodiment, the inventors have unexpectedly found that regeneration energy can be reduced by operating the absorber 101 with a product gas temperature elevation greater than about 15° C. In yet another embodiment, the inventors have unexpectedly found that regeneration energy can be reduced by operating the absorber 101 with a product gas temperature elevation greater than about 20° C. In still another embodiment, the inventors have unexpectedly found that regeneration energy can be reduced by operating the absorber 101 with a product gas temperature elevation greater than about 25° C. In still another embodiment, the inventors have unexpectedly found that regeneration energy can be reduced by operating the absorber 101 with a product gas temperature elevation greater than about 30° C. The amount of increase of the product gas temperature greater than zero will depend upon the properties of the particular solvent. The top number of the range of elevated temperature will be determined by the point beyond which the particular solvent characteristics capacity to absorb acid gases is exhausted.

To achieve an elevated product gas temperature, a source of heat within the absorber is provided. Heat may be provided to elevate the product gas temperature from the heat liberated as acid gas is absorbed into the liquid phase. Heat is liberated as acid gas condenses into the liquid phase. Additional heat is liberated as acid gas mixes and reacts in the liquid phase. As heat is released into the liquid phase, the liquid phase will increase in temperature. If the rising vapor is cooler than the falling liquid, then some fraction of the that heat will migrate to the vapor phase, causing the vapor phase temperature to increase, thereby increasing the vapor phase temperature in the upper section 102, and in particular, proximate to the absorber top 102a.

The product gas temperature elevation may be achieved by manipulating the absorber column operating conditions and/or solvent chemistry to increase the amount of absorption and reaction, which occurs close to the absorber top 102a. In turn, the top section liquid phase temperature is increased, and hence the product gas temperature is also increased. The control system 201 receives lean solvent solution and product gas stream temperature data proximate the lean solvent solution and product gas stream first contact point within the absorber 101, and one or more operational parameters including lean solvent solution temperature, solvent solution recirculation rate, and solvent to water ratio are adjusted in response thereto. The one or more operational parameters may be automatically adjusted by the control system 201 or may be manually adjusted in response to temperature measurements provided to the control system 201. For example, solvent recirculation rate may be controlled by a circulation pump which in turn is regulated by the control system.

In one embodiment, the solvent solution's ability to carry heat is increased. If the solvent solution has a relatively low heat capacity, it will experience a larger temperature increase for the same amount of heat released. In a first embodiment, this can be achieved by manipulating the constituent proportions of the solvent solution. In one embodiment, this may be achieved by manipulating the solvent to water (solvent/water) proportion or ratio. In another embodiment this may be achieved by manipulating the amine/water ratio. For example, most amines have a lower heat capacity than water, so increasing the amine/water ratio will improve the temperature increase for a given amount of heat released. Thus, the temperature of the lean solvent solution may be varied by the control system 201 regulating a metering system that modifies the ratio of solvent to water, thereby controlling the ratio to achieve the desired heat capacity and, hence temperature.

In one embodiment, the product gas temperature elevation may be achieved by providing a solvent solution having an amine/water proportion of about 15-70 weight percent (wt %) amine/balance water. The wt % for this example, and for this disclosure in its entirety, is based on a gas free basis. In another embodiment, a solvent solution is provided having a mono-ethanol amine/water proportion of about 10-40 wt %. In yet another embodiment, a solvent solution is provided having a methlydiethanol amine/water proportion of about 30-60 wt %. In one example, in an absorption system designed to operate with a monoethanol amine/water proportion of about 20 wt %, a product gas temperature elevation may be achieved by increasing above 20 wt %, to about 30 wt %.

In a second embodiment, the product gas temperature elevation may be achieved by decreasing the circulation rate of the solvent solution for a given gas rate. When the circulation rate is decreased for a given gas rate, and if the amount of heat released remains approximately constant, then the liquid phase temperature will increase. In one example, in an absorption system designed to operate with a recirculation rate of about 1000 gallons per minute (gpm), the recirculation rate was decreased while maintaining about the same amount of acid gas removal, thus releasing about the same amount of heat in the acid gas while providing less liquid to capture the same amount of heat, less liquid phase is available to capture the same amount of acid gas, resulting in an increase in the solvent solution temperature. For example, the recirculation rate may be decreased from about 1000 gpm to about 900 gpm.

In a third embodiment, the product gas temperature elevation may be achieved by increasing the lean solvent solution temperature over the recommended standard operating temperature. In one embodiment, the product gas temperature elevation may be achieved by increasing the lean amine-based wash fluid temperature. By increasing the lean wash fluid temperature, the liquid phase temperature in the upper portion of the absorber is increased, which increases the temperature of the product gas exiting the absorber 101. In one embodiment, increasing the lean wash fluid temperature from about 49° C. to about 52° C., increases the liquid phase temperature throughout absorber 101 by about 9° C.

In an example according to the present disclosure, a pilot plant was operated and removed carbon dioxide from atmospheric pressure synthetic flue gas using a wash fluid of about 30 wt % monoethanolamine (MEA), balance water. Within limitations of existing equipment and instrumentation, all runs used the same feed gas flow rate, pressure, amine concentration, lean amine temperature and carbon dioxide concentration. For a particular solvent flow rate, regeneration energy was adjusted to achieve one of three degrees of carbon dioxide recovery (90%, 74%, and 64%). The results of the experiments are summarized in FIG. 2.

Figure 2:
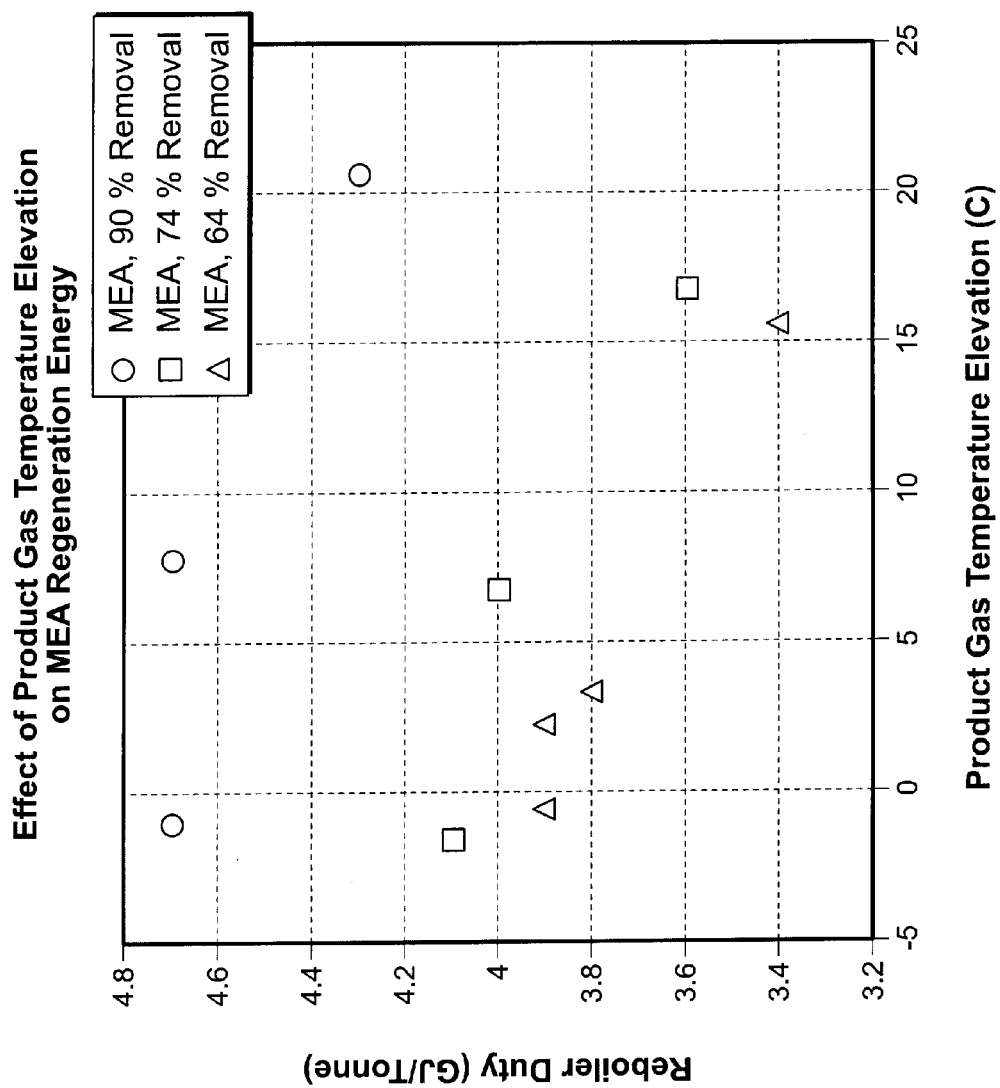
FIG. 2 is chart showing the effect of product gas temperature elevation on regeneration energy.

As can be seen in FIG. 2, operating the absorber at a product gas temperature elevation greater than zero reduced the energy requirement, as measured by reboiler duty in gigajoules (GJ) per metric ton (Tonne) carbon dioxide recovered. For example, it can be seen that increasing the product gas temperature from about −2° C. to about 7° C. resulted in a decrease of about 0.1 GJ/Tonne for a 74% removal. In another example, it can be seen that increasing the product gas temperature from about −1° C. to about 16° C. resulted in a decrease of about 0.5 GJ/Tonne for a 64% removal.

In another example according to the disclosure of the present invention, a simulation of commercial scale conventional amine unit designed to recover 90% of the carbon dioxide from a coal-derived flue gas using an aqueous methyldiethanolamine piperazine blend was performed. As in the previous example, feed gas conditions, amine concentration and lean amine temperature were kept constant. In addition, cold side exchanger approach was kept constant. Reboiler duty was adjusted to achieve 90% carbon dioxide recovery for a particular amine circulation rate. Calculations were limited to 90% carbon dioxide recovery. The results of the simulation are presented in FIG. 3.

Figure 3:
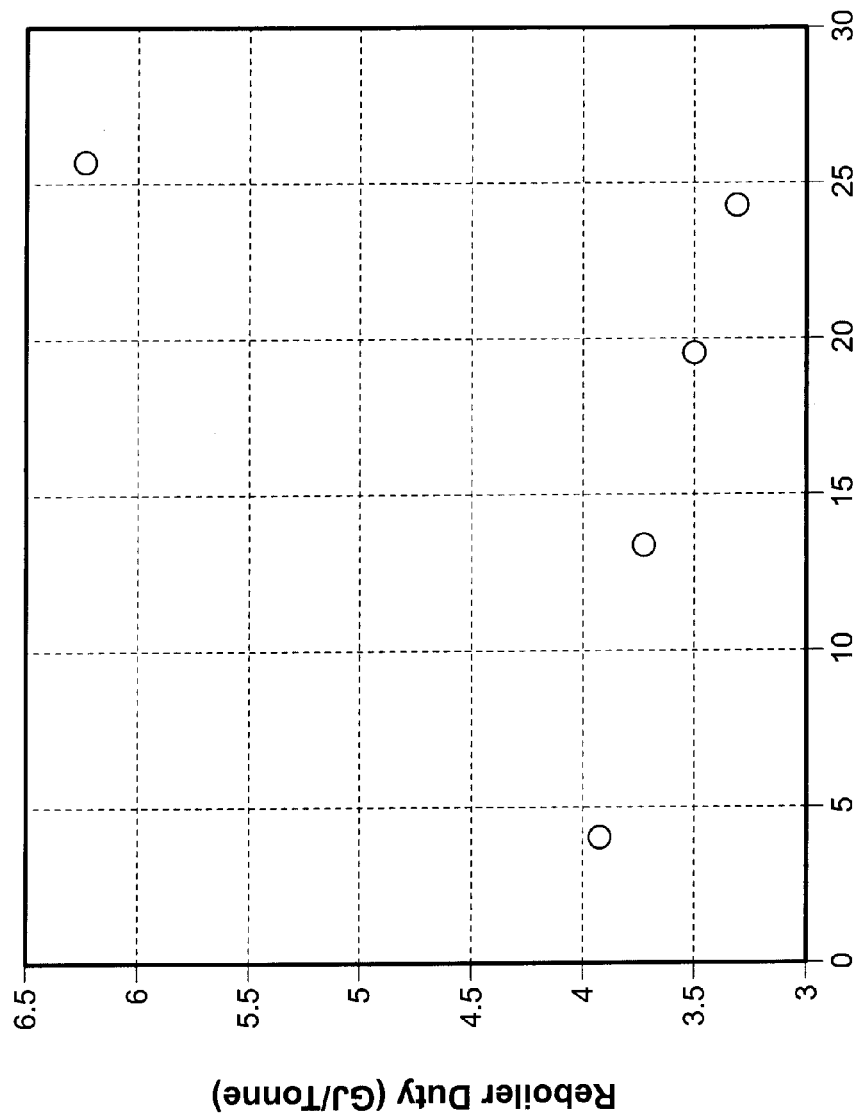
FIG. 3 is another chart showing the effect of product gas temperature elevation on regeneration energy.

As can be seen in FIG. 3, operating the absorber at a product gas temperature elevation greater than zero reduced the energy requirement, as measured by reboiler duty in GJ/Tonne carbon dioxide recovered. For example, it can be seen that increasing the product gas temperature from about 4° C. to about 24° C. resulted in a decrease of about 0.6 GJ/Tonne. Thus, as can be seen by the prior two examples, operating the absorber with high product gas temperature elevations reduce the energy requirement per tonne carbon dioxide recovered.

As can be seen in FIG. 3, operation at very high product gas temperature elevation eventually leads to a sharp increase in regeneration energy requirement. In this example, the sharp increase in regeneration energy is caused by the finite capacity of the aqueous amine solvent for carbon dioxide, as represented to the right of FIG. 3 by the data point located on the abscissa at 26C and at the ordiant at about 6.4 GJ/Tonne.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of removing acid gases from a gas stream, comprising the steps of:
    providing an absorber column;
    providing the gas stream to the absorber column;
    providing a lean solvent solution stream comprising an aqueous amine-based solvent solution to the absorber column;
    contacting the gas stream and the lean solvent solution stream in the absorber column to produce a product gas depleted of acid gases and a rich solvent solution;
    measuring a product gas temperature of the product gas in the absorber column at a first location proximal to where the lean solvent solution stream first contacts the gas stream;
    measuring a lean solvent temperature of the lean solvent solution stream at a second location proximal to where the lean solvent solution stream first contacts the gas stream;
    providing a regenerator;
    providing the rich solvent solution to the regenerator to produce a regenerated solvent solution stream;
    providing a heating unit wherein the regenerated solvent solution stream from the regenerator is heated by heat exchange relationship with heating fluid from the heating unit;
    adjusting at least one of the lean solvent temperature, a recirculation rate of the lean solvent solution stream, and a solvent-to-water ratio of the lean solvent solution stream to result in a product gas temperature elevation greater than 5° C., thereby reducing regeneration energy, wherein the product gas temperature elevation is the difference between the product gas temperature and the lean solvent temperature; and
    discharging a product gas stream of the product gas from the absorber column.

2. The method according to claim 1, wherein the gas stream comprises a flue gas.

3. The method of claim 1 wherein the product gas stream discharged from the absorber column is depleted of $CO_2$ gas when compared to the provided gas stream.

4. The method of claim 1 further comprising measuring at least one operational parameter selected from the group consisting of the recirculation rate of the lean solvent solution stream and the solvent-to-water ratio of the lean solvent solution stream.

5. The method according to claim 1, wherein the solvent-to-water ratio is adjusted to adjust the product gas temperature elevation.

6. The method of claim 5, wherein the product gas temperature elevation is increased by increasing the solvent-to-water ratio.

7. The method according to claim 1, wherein the solvent solution circulation rate is adjusted to adjust the product gas temperature elevation.

8. The method according to claim 7 wherein the product gas temperature elevation is increased by decreasing the solvent solution circulation rate.

9. The method of claim 1, wherein the lean solvent temperature is adjusted to adjust the product gas temperature elevation.

10. The method according to claim 9, wherein the product gas temperature elevation is increased by increasing the lean solvent temperature.

* * * * *

UNITED STATES PATENT AND TRADEMARK OFFICE
CERTIFICATE OF CORRECTION

PATENT NO.       : 9,522,359 B2
APPLICATION NO.  : 13/981227
DATED            : December 20, 2016
INVENTOR(S)      : Vitse et al.

Page 1 of 1

It is certified that error appears in the above-identified patent and that said Letters Patent is hereby corrected as shown below:

In the Drawings

In Fig. 3, Sheet 3 of 3, delete "on MDEA/Piperazine" and insert -- on MEA/Piperazine --, therefor.

In the Specification

In Column 1, Line 8, delete "a methods" and insert -- the methods --, therefor.

In Column 3, Line 37, delete "feed measurement" and insert -- feed line is provided for introducing the gas stream into the absorber. A first temperature measurement --, therefor.

In Column 4, Line 21, delete "is" and insert -- is a --, therefor.

In Column 7, Line 32, delete "the that" and insert -- that --, therefor.

In Column 7, Line 64, delete "embodiment" and insert -- embodiment, --, therefor.

In Column 8, Line 15, delete "methlydiethanol" and insert -- methyldiethanol --, therefor.

In Column 9, Line 32, delete "26C" and insert -- 26°C --, therefor.

Signed and Sealed this
Eighteenth Day of April, 2017

Michelle K. Lee
*Director of the United States Patent and Trademark Office*